United States Patent
Wu et al.

(10) Patent No.: US 8,084,112 B2
(45) Date of Patent: *Dec. 27, 2011

(54) GLYCOLURIL RESIN AND ACRYLIC RESIN MEMBERS

(75) Inventors: Jin Wu, Pittsford, NY (US); Jonathan H Herko, Walworth, NY (US); Scott J Griffin, Fairport, NY (US); Michael S Roetker, Webster, NY (US); Dante M Pietrantoni, Rochester, NY (US); David W Martin, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/550,486

(22) Filed: Aug. 31, 2009

(65) Prior Publication Data

US 2011/0052854 A1   Mar. 3, 2011

(51) Int. Cl.
- *B32B 1/00* (2006.01)
- *B32B 27/08* (2006.01)
- *B32B 27/20* (2006.01)
- *B32B 27/30* (2006.01)
- *B32B 27/34* (2006.01)
- *B32B 27/36* (2006.01)
- *G03G 15/16* (2006.01)

(52) U.S. Cl. ............... 428/36.91; 428/412; 428/421; 428/422; 428/473.5; 428/474.4; 428/480; 428/522; 399/308

(58) Field of Classification Search ............... None
See application file for complete search history.

(56) References Cited

U.S. PATENT DOCUMENTS

| | | | |
|---|---|---|---|
| 5,487,707 A | 1/1996 | Sharf et al. | |
| 6,318,223 B1 | 11/2001 | Yu et al. | |
| 6,440,515 B1 | 8/2002 | Thornton et al. | |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 2004/0221942 A1* | 11/2004 | Yu et al. .................. | 156/157 |
| 2007/0248813 A1* | 10/2007 | Wu et al. .................. | 428/337 |
| 2009/0050255 A1 | 2/2009 | Herko et al. | |
| 2011/0052840 A1 | 3/2011 | Wu | |
| 2011/0053070 A1 | 3/2011 | Wu et al. | |

OTHER PUBLICATIONS

Jin Wu, U.S. Application No. (Not yet assigned) entitled Carbon Black Polymeric Intermediate Transfer Members, filed concurrently herewith, U.S. Appl. No. 12/550,589.
Jin Wu et al., U.S. Application No. (Not yet assigned) entitled Glycoluril Resin and Acrylic Resin Dual Members, filed concurrently herewith, U.S. Appl. No. 12/550,492.
Jin Wu, U.S. Appl. No. 12/413,627 entitled Resin Mixture Backing Layer Containing Photoconductor, filed Mar. 30, 2009.
Jin Wu, U.S. Appl. No. 12/413,645 entitled Layered Intermediate Transfer Members, filed Mar. 30, 2009.
Jin Wu et al., U.S. Appl. No. 12/413,783 entitled Glycoluril Resin and Polyol Resin Members, filed Mar. 30, 2009.
Jin Wu et al., U.S. Appl. No. 12/413,795 entitled Glycoluril Resin and Polyol Resin Dual Members, filed Mar. 30, 2009.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.
Jin Wu, U.S. Appl. No. 12/129,995 on Polyimide Intermediate Transfer Components, filed May 30, 2008.
Jin Wu, U.S. Appl. No. 12/181,354, on Core Shell Intermediate Transfer Components, filed Jul. 29. 2008.
Jin Wu, U.S. Appl. No. 12/181,409 on Treated Carbon Black Intermediate Transfer Components, filed Jul. 29, 2008.

* cited by examiner

*Primary Examiner* — Ramsey Zacharia
(74) *Attorney, Agent, or Firm* — Oliff & Berridge, PLC

(57) ABSTRACT

An intermediate transfer member, such as a belt, where the seam or seams thereof on the member contain a coating mixture of a glycoluril resin and a self crosslinking acrylic resin.

24 Claims, No Drawings

GLYCOLURIL RESIN AND ACRYLIC RESIN MEMBERS

CROSS REFERENCE TO RELATED APPLICATIONS

Copending U.S. application Ser. No. 12/550,589, U.S. Publication No. 20110052840, filed Aug. 31, 2009, on Carbon Black Polymeric Intermediate Transfer Members, the disclosure of which is totally incorporated herein by reference, illustrates an intermediate transfer member comprised of a mixture of carbon black, a first copolymer comprised of a polyester, a polycarbonate and a polyalkylene glycol, and a second copolymer.

Copending U.S. application Ser. No. 12/550,492, U.S. Publication No. 20110053070, filed Aug. 31, 2009, on Glycoluril Resin and Acrylic Resin Dual Members, the disclosure of which is totally incorporated herein by reference, illustrates a process which comprises providing a flexible belt having at least one welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and an acrylic resin.

Copending U.S. application Ser. No. 12/413,627, U.S. Publication No. 20100248103, filed Mar. 30, 2009, entitled Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a glycoluril resin, and a polyol resin mixture.

Copending U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Illustrated in copending U.S. application Ser. No. 12/413,783, U.S. Publication No. 20100248107, filed Mar. 30, 2009, Glycoluril Resin and Polyol Resin Members, the disclosure of which is totally incorporated herein by reference, is an intermediate transfer member comprised of a seamed substrate, and wherein the seam is coated with a mixture of a glycoluril resin and a polyol resin.

Copending U.S. application Ser. No. 12/413,795, U.S. Publication No. 20100248108, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin or polymer.

Illustrated in U.S. application Ser. No. 12/200,147 U.S. Publication No. 20100055328, filed Aug. 28, 2008, entitled Coated Seamed Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/200,179 U.S. Publication No. 20100051171, filed Aug. 28, 2008, entitled Coated Transfer Member, the disclosure of which is totally incorporated herein by reference, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 11/895,255, filed Aug. 22, 2007, U.S. Publication No. 20090050255, the disclosure of which is totally incorporated here by reference, is a process for the post treatment of an ultrasonically welded seamed flexible imaging member belt comprising providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by vacuum; contacting the rough seam region with a heat and pressure applying tool; and smoothing out the rough seam region with heat and pressure applied by the heat and pressure applying tool to produce a flexible belt having a smooth welded seam without removing the seam material.

BACKGROUND

Disclosed are intermediate transfer members, and more specifically, coated seamed intermediate transfer members useful in transferring a developed image in an electrostatographic, for example xerographic, including digital, image on image, and the like, printers, machines or apparatuses. In embodiments, there are selected, for example, seamed intermediate transfer members comprised of a conductive material like carbon black, a polyaniline, or mixtures thereof dispersed in a polymer solution, such as a polyamic acid solution illustrated in copending applications U.S. application Ser. No. 12/129,995, U.S. application Ser. No. 12/181,354, and U.S. application Ser. No. 12/181,409, the disclosures of which are totally incorporated herein by reference; and thereafter, applying a crosslinked mixture of a glycoluril resin and a self crosslinking acrylic resin onto the seam, especially a reverse double welded seam, where the seam is formed by ultrasonic welding on one side followed by ultrasonic welding on the opposite side.

Intermediate transfer belts can be generated in the form of seamed belts fabricated by fastening two ends of a web material together, such as by welding, sewing, wiring, stapling, or gluing. While seamless intermediate transfer belts are known, they may require manufacturing processes that render them more costly as compared to similar seamed intermediate transfer belts.

Seamed belts can be fabricated from a sheet cut that originates from an imaging member web. The sheets are generally rectangular, or in the shape of a parallelogram where the seam does not form a right angle to the parallel sides of the sheet. All edges may be of the same length, or one pair of parallel edges may be longer than the other pair of parallel edges. The sheets are formed into a belt by joining overlapping opposite marginal end regions of the sheet. A seam is typically produced in the overlapping marginal end regions at the point of joining. Joining of the aforementioned areas may be effected by any suitable means, such as by welding like ultrasonic welding, gluing, taping, pressure heat fusing, and the like.

Ultrasonic welding can be accomplished by retaining in a down position the overlapped ends of a flexible imaging member sheet with a vacuum against a flat anvil surface, and guiding the flat end of an ultrasonic vibrating horn transversely across the width of the sheet, over and along the length of the overlapped ends, to form a welded seam. Ultrasonically welding results in an overlap seam that has an irregular surface topology rendering it difficult for a cleaning blade to remove toner around the seam, and such welding can also cause damage to the cleaning blades by nicking the cleaning edge of the blade. In addition, toner trapping resulting from the poor cleaning and the blade damage causes streaking from the seam and creates an image quality problem. Many post fabrication seam smoothing techniques, which remove material from the seam, may also degrade seam strength.

Also, when ultrasonically welded into a belt, the seam of a multilayered electrophotographic flexible imaging member may occasionally contain undesirable high protrusions such as peaks, ridges, spikes, and mounds. These seam protrusions present problems during image cycling of the belt because they interact with the cleaning blade causing blade wear and tear, which can affect cleaning blade efficiency and reduce service life.

In a typical electrostatographic reproducing apparatus, a light image of an original to be copied is recorded in the form of an electrostatic latent image upon a photosensitive member or photoconductor, and the latent image is subsequently rendered visible by the application of electroscopic thermoplastic resin particles and colorant. Generally, the electrostatic latent image is developed by a developer mixture comprised of carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a substrate like paper. It is advantageous to transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photoconductor or other support such as plain paper.

In electrostatographic printing machines wherein the toner image is electrostatically transferred by a potential difference between the imaging member and the intermediate transfer member, the transfer of the toner particles to the intermediate transfer member, and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members in a xerographic environment allow for a number of advantages such as enabling high throughput at modest process speeds, improving registration of the final color toner image in color systems using synchronous development of one or more component colors using one or more transfer stations, and increasing the variety of final substrates that can be used. However, a bump, surface irregularity, or other discontinuity in the seam of the member, such as a belt, may disturb the tuck of the cleaning blade as it makes intimate contact with the photoconductive member surface to effect residual toner and debris removal. The increased height differential may allow toner to pass under the cleaning blade, and not be cleaned. Furthermore, seams having differential heights may, when subjected to repeated striking by cleaning blades, cause photoconductive member cycling speed disturbance which adversely affects the crucial photoconductive belt motion quality. Moreover, seams with a bump or any morphological defects can cause the untransferred residual toner to be trapped in the sites of the seam surface irregularities. The seam of a photoreceptor belt, which is repeatedly subjected to the striking action by a cleaning blade under machine functioning conditions, can trigger the development of premature seam delamination failure. In addition, the discontinuity in belt thickness due to the presence of an excessive seam height yields variances of mechanical strength in the belt, and reduces the fatigue flex life of the seam when cycling over belt module support rollers. As a result, both the cleaning life of the blade, and the overall service life of the photoreceptor belt can be diminished.

Moreover, the protrusion high spots in the seam may also interfere with the operation of subsystems of copiers, printers and duplicators by damaging electrode wires used in development that position the wires parallel to and closely spaced from the outer imaging surface of belt photoreceptors. These closely spaced wires are employed to facilitate the formation of a toner powder cloud at a development zone adjacent to a toner donor roll, and the imaging surface of the belt imaging member.

In operation, an intermediate transfer belt is contacted with a toner image bearing member such as a photoreceptor belt. In the contact zone, an electrostatic field generating device, such as a corotron, a bias transfer roller, a bias blade, or the like, creates electrostatic fields that transfer toner onto the intermediate transfer belt. Subsequently, the intermediate transfer belt is brought into contact with a receiver. An electrostatic field generating device then transfers toner from the intermediate transfer belt to the receiver. Depending on the system, a receiver can be another intermediate transfer member, or a substrate onto which the toner will eventually be fixed.

Thus, there is a need for a seamed member, such as a belt, that avoids or eliminates a number of the disadvantages mentioned herein, and more specifically, there is a need for an intermediate transfer belt (ITB) with a coated seam or double welded seam surface topology such that it can withstand dynamic fatigue conditions; where the seam or seams are of minimum visibility and possess excellent surface resistivities; where, in embodiments, a reverse double welded seam can be achieved without additional finishing steps, such as sanding; and where the coating layer is mechanically robust and electrically matches the surface resistivity of the seamed ITB, and adheres strongly to the ITB base layer. For example, the coated seam as disclosed herein provides a smooth surface with substantially decreased or eliminated profile protrusions or irregularities thereby extending its service life. There is also a need for a substantially completely imageable seam, which avoids or minimizes the disadvantages indicated herein by overcoating the seam with a conducting polymer mixture layer, and which layer is mechanically robust and electrically matches the surface resistivity of the seamed intermediate transfer belt (ITB), or intermediate transfer member, which resistivity is, for example, from about $10^9$ to about $10^{13}$ ohm/sq.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and very costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

SUMMARY

According to embodiments illustrated herein, there is provided a flexible intermediate transfer member, such as a belt (ITB), that has an excellent surface topology of its welded overlap seam while maintaining seam strength, and processes for the preparation of flexible belts.

In embodiments, there is disclosed a process for the treatment, especially post treatment of an ultrasonically welded seamed flexible imaging member belt comprising providing a flexible belt having at least one, such as one or two welded seams extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure being applied by the heat and pressure applying tool to produce a flexible belt having a smooth welded seam without substantially removing any seam material; and then subsequently coating the seam with a crosslinked resin mixture of a glycoluril resin and a self crosslinking acrylic resin; and an intermediate transfer member, such as an intermediate transfer belt, comprised of a seamed substrate, and wherein the seam is coated with a resin mixture of a glycoluril resin and a self crosslinking acrylic resin.

Embodiments illustrated herein also provide a process for the post treatment of an ultrasonically welded seamed flexible imaging member belt comprising providing a flexible belt having a welded seam extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool, the heat and pressure applying tool being selected from the group consisting of an ultrasonic vibrating horn, an automated heated pressure roller, and a heated upper anvil; smoothing out the rough seam region with heat and pressure to produce a flexible belt having a smooth welded seam; and thereafter overcoating the seam with the resin mixture illustrated herein; and a process which comprises providing a flexible belt having a welded seam extending from one parallel edge to the other parallel edge, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam, and subsequently coating the entire seam with the resin mixture illustrated herein.

Embodiments illustrated herein also provide an intermediate transfer member and processes thereof for the post treatment of an ultrasonically reverse double welded seamed flexible imaging member belt comprising providing a flexible belt having a welded seam extending from one parallel edge to the other parallel edge of the member, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool, the heat and pressure applying tool being selected from the group consisting of an ultrasonic vibrating horn, an automated heated pressure roller, and a heated upper anvil; smoothing out the rough seam region with heat and pressure to produce a flexible belt having a smooth welded seam; and repeating the welding process on the opposite side of the welded flexible belt; and thereafter overcoating the seam with the resin mixture illustrated herein; and a process which comprises providing a flexible belt photoconductor having a welded seam extending from one parallel edge to the other parallel edge of the belt, the welded seam having a rough seam region comprising an overlap of two opposite edges; positioning the flexible belt on a lower anvil such that the flexible belt is held in position on the lower anvil by a vacuum; contacting the rough seam region with a heat and pressure applying tool; and smoothing out the rough seam region with heat and pressure applied by the heat and pressure applying tool to produce a flexible belt having a smooth welded seam; and repeating the welding process on the opposite side of the seamed flexible belt; and subsequently coating the entire seam with the resin mixture illustrated herein.

DETAILED DESCRIPTION

Aspects of the present disclosure relate to a process which comprises
providing a flexible belt having at least one welded seam extending from one parallel edge to the other parallel edge, the welded seam having a rough seam region comprising an overlap of two opposite edges;
contacting the rough seam region with a heat and pressure applying tool; and
smoothing out the rough seam region with heat and pressure applied by the heat and pressure applying tool to produce a flexible belt having a smooth welded seam, and subsequently coating the seam with a resin mixture of a glycoluril resin and an acrylic resin; an intermediate transfer member comprised of at least one seamed substrate, and wherein the seam is coated with a crosslinked mixture of a glycoluril resin and an acrylic resin; an intermediate transfer belt comprised of a supporting substrate with from about 1 to about 4 seams, and wherein the seams contain a coating of a mixture of a glycoluril resin and a self crosslinking acrylic resin; an intermediate transfer member comprised of at least one seamed substrate, including a reverse double welded seam, and wherein the seam or double welded seam is coated with a mixture of a glycoluril resin and a self crosslinking acrylic resin; a process which comprises providing a flexible belt having a welded seam extending from one parallel edge to the other parallel edge of the belt, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a mixture of a glycoluril resin and a self crosslinking acrylic resin; an intermediate transfer member comprised of a seamed substrate, and wherein the seam is coated with a mixture of a glycoluril resin and an acrylic resin, wherein the glycoluril resin is represented by the formulas/structures illustrated herein; a process which comprises providing a flexible belt having two welded seams extending from one parallel edge to the other parallel edge of the belt, the welded seam having a rough seam region comprising an overlap of two opposite edges; positioning the flexible belt on the lower portion of an anvil such that the flexible belt is held in position on the lower anvil by a vacuum; contacting the rough seam region with heat and pressure; smoothing out the rough seam region with heat and pressure applied by a known heat and pressure applying device to produce a flexible belt having a smooth welded seam, and subsequently coating the seam with a crosslinked mixture of a glycoluril resin and a self crosslinking acrylic resin; an intermediate transfer member comprised of a seamed substrate, and wherein the seam is fully, for example from about 95 to about 100 percent, coated with a mixture of a glycoluril resin and an acrylic resin; an intermediate transfer belt comprised of a reverse double seamed substrate, and wherein the double seam is coated with a mixture of a crosslinked glycoluril resin, an acrylic resin and a catalyst; and a polymeric coated seamed member inclusive of flexible belts, fuser belts, pressure belts, intermediate transfer belts, transfuse belts, transport belts, developer belts, photoreceptor belts, and the like where the polymeric coating is comprised of a glycoluril resin and an acrylic resin; and a process for overcoating a welded seam, for example, a double welded seam (welded twice) with a polymeric layer comprised of a glycoluril resin and a self crosslinking acrylic resin, which coating layer is mechanically robust and electrically, in embodiments, matches the surface resistivity of the seamed ITB, which resistivity is, for example, from about $10^9$ to about $10^{13}$ ohm/sq.

The coated, with a mixture of a glycoluril resin and an acrylic resin, seamed members, such as belts, flexible belts, photoreceptors, electroreceptors, and the like, can be prepared by a number of processes, such as a process which forms a strength enhancing bond between voids of mutually mating elements. The strength enhancing bond may comprise a material which is chemically and physically compatible with the material of the coating layer or layers of the belt. The resin coated welded seam or double seam has a smooth surface topology as determined by the hand touching thereof to thereby improve both the cleaning life of the cleaning blade and the overall service life of the flexible belt. More specifically, embodiments disclosed herein relate to a post treatment process for efficiently and consistently smoothing an ultrasonically welded mixture of a glycoluril resin, and a self crosslinking acrylic resin coated overlap seam of a flexible belt that does not degrade seam strength, and where the coating is mechanically robust, and electrically is equal to or about equal to the surface resistivity of the seamed belt.

Examples of the glycoluril resins are, for example, represented by the following formula/structure

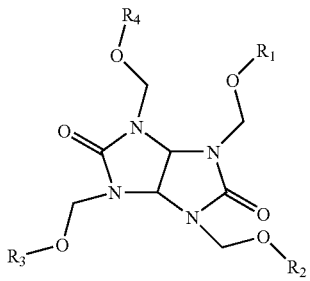

wherein each R substituent independently represents at least one of a hydrogen atom, and an alkyl with, for example, 1 to about 18, from 1 to about 10, from 1 to about 8, or from 1 to about 4 carbon atoms.

Examples of the glycoluril resin include unalkylated and highly alkylated glycoluril resins like CYMEL® and POWDERLINK® glycoluril resins commercially available from CYTEC Industries, Inc. Specific examples of the disclosed glycoluril resin include CYMEL® 1170 (a highly butylated resin with at least 75 percent of the R groups being butyl with the remainder of the R groups being hydrogen; viscosity equal to about 3,000 to about 6,000 centipoise at 23° C.); CYMEL® 1171 (a highly methylated-ethylated with at least 75 percent of the R groups being methyl/ethyl and the remainder of the R groups being hydrogen, viscosity=to about 3,800 to about 7,500 centipoise at 23° C.); CYMEL® 1172 (an unalkylated resin with the R groups being hydrogen); and POWDERLINK® 1174 (a highly methylated resin with at least 75 percent of the R groups being methyl and the remainder of the R groups being hydrogen, a solid at 23° C.).

The number average molecular weight of the glycoluril resin is, for example, from about 200 to about 1,000, or from about 250 to about 600. The weight average molecular weight of the glycoluril resin is, for example, from about 230 to about 3,000, or from about 280 to about 1,800.

Examples of the selected acrylic resin, and more specifically, a self crosslinked acrylic resin, that is for example, where a crosslinking component is avoided, include the resin DORESCO® TA22-8, available from Lubrizol Dock Resins, Linden, N.J., and substantially free of any conductive components dispersed within. By the addition of a small amount of an acid catalyst, the acrylic resin self crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust crosslinked acrylic resin layer with a surface resistivity of from about $10^9$ to about $10^{13}$ ohm/sq, and specifically about $10^{11}$ ohm/sq. While the percentage of crosslinking can be difficult to determine, and not being desired to be limited by theory, the self crosslinking acrylic resin layer is crosslinked to a suitable value, such as for example, from about 30 to about 100 percent, and from about 50 to about 95 percent.

In embodiments, examples of the self crosslinking acrylic resin selected for the coating mixture have, for example, a weight average molecular weight ($M_w$) of from about 100,000 to about 500,000, or from about 120,000 to about 200,000; a polydispersity index (PDI) ($M_w/M_n$) of from about 1.5 to about 4, or from about 2 to about 3; and a surface resistivity (at, for example, 20° C. and 50 percent humidity) of from about $10^8$ to about $10^{14}$ ohm/sq, or from about $10^9$ to about $10^{12}$ ohm/sq. A specific example of a self crosslinking acrylic resin selected for coating the belt seam includes DORESCO® TA22-8, 30 weight percent solids, and a glass transition temperature of about 79° C., as obtained from Lubrizol Dock Resins, Linden, N.J., which resin in one form possesses, it is believed, a weight average molecular weight of about 160,000, a polydispersity index of about 2.3, and a surface resistivity (20° C. and 50 percent humidity) of about $10^{11}$ ohm/sq.

Other examples of the self crosslinking acrylic resin selected for coating the seam include DORESCO® TA22-51, obtained from Lubrizol Dock Resins, Linden, N.J., which resin possesses lower crosslinking density upon thermal cure as compared to DORESCO® TA22-8 resin.

By the addition of a small amount of an acid catalyst, the mixture of the glycoluril resin and the acrylic resin crosslinks upon thermal curing at temperatures of, for example, from about 80° C. to about 200° C. for a suitable time period, such as for example, from about 1 to about 60 minutes, and more specifically, curing at about 160° C. for 20 minutes, resulting in a mechanically robust crosslinked mixture of a glycoluril resin and an acrylic resin layer with a surface resistivity of from about $10^9$ to about $10^{13}$ ohm/sq, and specifically about $10^{11}$ ohm/sq.

Self crosslinking acrylic resin refers, for example, to this resin being crosslinked simply by heating, and in embodiments where a catalyst can be selected to assist in the crosslinking. In addition, the glycoluril and acrylic resin mixture crosslinks, especially in the presence of a catalyst.

The thickness of the layer comprised of the mixture of a glycoluril resin and a the acrylic resin on the seam or double seam can vary, for example, this thickness can be from about 1 to about 30 microns, from about 2 to about 16 microns, from about 3 to about 12 microns, and yet more specifically, 6 microns.

When the entire seam is overcoated, the width of the mixture of the glycoluril resin and acrylic resin coating on the seam can vary, for example, this width can be from about 1 to about 20 centimeters, from about 2 to about 10 centimeters, and yet more specifically, about 6 centimeters.

The circumference of the transfer member in a film or belt configuration of from 1 to 2, or more layers is, for example, from about 250 to about 2,500 millimeters, from about 1,500 to about 2,500 millimeters, or from about 2,000 to about 2,200 millimeters. The width of the film or belt is, for example, from about 100 to about 1,000 millimeters, from about 200 to about 500 millimeters, or from about 300 to about 400 millimeters. The thickness of the film or belt is, for example, from about 25 to about 500 microns, or from about 50 to 150 microns.

Nonlimiting examples of catalysts selected for the crosslinking of the polymeric mixture of the glycoluril resin and the acrylic resin include oxalic acid, maleic acid, carboxylic acid, ascorbic acid, malonic acid, succinic acid, tartaric acid, citric acid, p-toluenesulfonic acid, methanesulfonic acid, and the like, and mixtures thereof. A typical concentration of the acid catalyst selected is, for example, from about 0.01 to about 5 weight percent, about 0.5 to about 4 weight percent, and about 1 to about 3 weight percent based on the weight of the mixture of a glycoluril resin and the acrylic resin.

A blocking agent can also be included in the coating resin mixture illustrated herein, which agent can "tie up" or substantially block the acid catalyst effect to provide solution stability until the acid catalyst function is initiated. Thus, for example, the blocking agent can block the acid effect until the solution temperature is raised above a threshold temperature. For example, some blocking agents can be used to block the acid effect until the solution temperature is raised above about 100° C. At that time, the blocking agent dissociates from the acid and vaporizes, and the unassociated acid is then free to act as a catalyst. Examples of such suitable blocking agents include, but are not limited to, pyridine and commercial acid solutions containing blocking agents, such as CYCAT® 4045, available from Cytec Industries Inc.

The disclosed seam or doubled seamed coating resin mixture further optionally comprises a siloxane component or a fluoro component, each present in an amount of, for example, from about 0.1 to about 20 weight percent, or from about 0.5 to about 5 weight percent, which component can co-crosslink with the two resin mixture, and thereby render an overcoat with excellent slippery characteristics.

Examples of the crosslinkable siloxane component include hydroxyl derivatives of silicone modified polyacrylates such as BYK-SILCLEAN® 3700; polyether modified acryl polydimethylsiloxanes such as BYK-SILCLEAN® 3710; and polyether modified hydroxyl polydimethylsiloxanes such as BYK-SILCLEAN® 3720.

Examples of the crosslinkable fluoro component that may be selected include (1) hydroxyl derivatives of perfluoropolyoxyalkanes such as FLUOROLINK® D (M.W. of about 1,000 and a fluorine content of about 62 percent), FLUOROLINK® D10-H (M.W. of about 700 and fluorine content of about 61 percent), and FLUOROLINK® D10 (M.W. of about 500 and fluorine content of about 60 percent) (functional group —$CH_2OH$); FLUOROLINK® E (M.W. of about 1,000 and a fluorine content of about 58 percent), and FLUOROLINK® E10 (M.W. of about 500 and fluorine content of about 56 percent) (functional group —$CH_2(OCH_2CH_2)_n$OH); FLUOROLINK® T (M.W. of about 550 and fluorine content of about 58 percent), and FLUOROLINK® T10 (M.W. of about 330 and fluorine content of about 55 percent) (functional group —$CH_2OCH_2CH(OH)CH_2OH$); (2) hydroxyl derivatives of perfluoroalkanes ($R_fCH_2CH_2OH$, wherein $R_f$=F$(CF_2CF_2)_n$) wherein n represents the number of groups, such as about 1 to about 50, such as ZONYL® BA (M.W. of about 460 and fluorine content of about 71 percent), ZONYL® BA-L (M.W. of about 440 and fluorine content of about 70 percent), ZONYL® BA-LD (M.W. of about 420 and fluorine content of about 70 percent), and ZONYL® BA-N (M.W. of about 530 and fluorine content of about 71 percent);

(3) carboxylic acid derivatives of fluoropolyethers such as FLUOROLINK® C (M.W. of about 1,000 and fluorine content of about 61 percent); (4) carboxylic ester derivatives of fluoropolyethers such as FLUOROLINK® L (M.W. of about 1,000 and fluorine content of about 60 percent), FLUOROLINK® L10 (M.W. of about 500 and fluorine content of about 58 percent); (5) carboxylic ester derivatives of perfluoroalkanes ($R_fCH_2CH_2O(C=O)R$ wherein $R_f=F(CF_2CF_2)_n$, and n is as illustrated herein, and R is alkyl) such as ZONYL® TA-N (fluoroalkyl acrylate, $R=CH_2=CH-$, M.W. of about 570 and fluorine content of about 64 percent), ZONYL® TM (fluoroalkyl methacrylate, $R=CH_2=C(CH_3)-$, M.W. of about 530 and fluorine content of about 60 percent), ZONYL® FTS (fluoroalkyl stearate, $R=C_{17}H_{35}-$, M.W. of about 700 and fluorine content of about 47 percent), ZONYL® TBC (fluoroalkyl citrate, M.W. of about 1,560 and fluorine content of about 63 percent); (6) sulfonic acid derivatives of perfluoroalkanes ($R_fCH_2CH_2 SO_3H$, wherein $R_f=F(CF_2CF_2)_n$), and n is as illustrated herein, such as ZONYL® TBS (M.W. of about 530 and fluorine content of about 62 percent); (7) ethoxysilane derivatives of fluoropolyethers such as FLUOROLINK® 10 (M.W. of about 1,750 to about 1,950); and (8) phosphate derivatives of fluoropolyethers such as FLUOROLINK® F10 (M.W. of about 2,400 to about 3,100). The FLUOROLINK® additives are available from Ausimont USA, and the ZONYL® additives are available from E.I. DuPont.

Examples of additional optional components present in the disclosed seam coating layer resin mixture include a number of known conductive components, such as polyaniline, carbon black or a metal oxide, each present in an amount of from about 0.1 to about 60 weight percent, or from about 1 to about 30 weight percent, or from about 3 to about 15 weight percent.

In embodiments, the polyaniline component selected has, in embodiments, a relatively small particle size of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the seam overcoat are PANIPOL™ F, commercially available from Panipol Oy, Finland; and lignosulfonic acid grafted polyaniline.

Examples of carbon blacks selected as the conductive component include VULCAN® carbon blacks, REGAL® carbon blacks, MONARCH® carbon blacks and BLACK PEARLS® carbon blacks available from Cabot Corporation. Specific examples of conductive carbon blacks are BLACK PEARLS® 1000 (B.E.T. surface area=343 $m^2/g$, DBP absorption=1.05 ml/g), BLACK PEARLS® 880 (B.E.T. surface area=240 $m^2/g$, DBP absorption=1.06 ml/g), BLACK PEARLS® 800 (B.E.T. surface area=230 $m^2/g$, DBP absorption=0.68 ml/g), BLACK PEARLS® L (B.E.T. surface area=138 $m^2/g$, DBP absorption=0.61 ml/g), BLACK PEARLS® 570 (B.E.T. surface area=110 $m^2/g$, DBP absorption=1.14 ml/g), BLACK PEARLS® 170 (B.E.T. surface area=35 $m^2/g$, DBP absorption=1.22 ml/g), VULCAN® XC72 (B.E.T. surface area=254 $m^2/g$, DBP absorption=1.76 ml/g), VULCAN® XC72R (fluffy form of VULCAN® XC72), VULCAN® XC605, VULCAN® XC305, REGAL® 660 (B.E.T. surface area=112 $m^2/g$, DBP absorption=0.59 ml/g), REGAL® 400 (B.E.T. surface area=96 $m^2/g$, DBP absorption=0.69 ml/g), REGAL® 330 (B.E.T. surface area=94 $m^2/g$, DBP absorption=0.71 ml/g), MONARCH® 880 (B.E.T. surface area=220 $m^2/g$, DBP absorption=1.05 ml/g, primary particle diameter=16 nanometers), and MONARCH® 1000 (B.E.T. surface area=343 $m^2/g$, DBP absorption=1.05 ml/g, primary particle diameter=16 nanometers); and Channel carbon blacks available from Evonik-Degussa. Specific examples of conductive carbon blacks are Special Black 4 (B.E.T. surface area=180 $m^2/g$, DBP absorption=1.8 ml/g, primary particle diameter=25 nanometers), Special Black 5 (B.E.T. surface area=240 $m^2/g$, DBP absorption=1.41 ml/g, primary particle diameter=20 nanometers), Color Black FW1 (B.E.T. surface area=320 $m^2/g$, DBP absorption=2.89 ml/g, primary particle diameter=13 nanometers), Color Black FW2 (B.E.T. surface area=460 $m^2/g$, DBP absorption=4.82 ml/g, primary particle diameter=13 nanometers), and Color Black FW200 (B.E.T. surface area=460 $m^2/g$, DBP absorption=4.6 ml/g, primary particle diameter=13 nanometers).

Examples of metal oxides selected as a conductive component include tin oxide, antimony doped tin oxide, indium oxide, indium tin oxide, zinc oxide, and titanium oxide.

The end marginal regions of the intermediate transfer member can be joined by any suitable means including gluing, taping, stapling, pressure, and heat fusing to form a continuous member such as a belt, sleeve, or cylinder. Both heat and pressure can be used to bond the end marginal regions into a seam in the overlap region. The flexible member is thus transformed from a sheet of an intermediate transfer material into a continuous intermediate transfer belt. The flexible member has a first exterior major surface or side, and a second exterior major surface or side on the opposite side. The seam joins the flexible member so that the bottom surface, generally including at least one layer immediately above, at and/or near the first end marginal region is integral with the top surface, generally including at least one layer immediately below, at and/or near the second end marginal region.

A heat and pressure seam joining means includes ultrasonic welding to transform the sheet of an intermediate transfer material into an intermediate transfer belt. The belt can be fabricated by ultrasonic welding of the overlapped opposite end regions of a sheet. In the ultrasonic seam welding process, ultrasonic energy applied to the overlap region is used to melt suitable layers.

Ultrasonic welding is selected, in embodiments, for joining the flexible intermediate transfer member because it is rapid, clean, solvent free, of low cost, and it produces a thin narrow seam. In addition, ultrasonic welding is selected since the mechanical high frequency pounding of the welding horn causes the generation of heat at the contiguous overlapping end marginal regions of the flexible imaging sheet loop to maximize melting of one or more layers therein to form a strong and precisely defined seam joint. For example, ultrasonic welding and an apparatus for performing the same are disclosed in U.S. Pat. No. 4,532,166, the disclosure of which is totally incorporated herein by reference.

In a specific embodiment, the heat and pressure applying tool is an ultrasonic vibrating horn where the lower anvil selected may be a flat anvil, and where the tool smoothes out the rough seam region by proceeding with a second welding pass across the welded region such that the rough seam region is further compressed under high pressure and heat. Since the post treatment smoothing process uses the welding horn to further compress the overlap, rather than removing the protruding material, seam strength is not substantially degraded. Moreover, the welded seam may be double welded from the back side of the seam as well. In such embodiments, the second welding pass is accomplished with the seam inverted on the anvil so that the imaging side of the belt is facing down on the anvil. In this manner, the overlap on the image side of the belt can be substantially eliminated as it conforms to the smooth surface of the anvil.

The heat and pressure applying tool is, in embodiments, an automated heated pressure roller or a heated upper anvil. In these embodiments, the lower anvil is a round anvil, and an edge of the seam region is positioned on an apex of the lower anvil, and where a smooth seam with no protrusion results by traversing the automated heated pressure roller along the seam to reform the edge of the seam region. The heated pressure roller applies pressure on the welded seam against the lower anvil while heating the seam such that a smooth welded seam is produced with the belt held in place by a vacuum on the lower anvil while the heated pressure roller traverses the seam. To effectively heat roll the seam smooth, the roller to the seam is positioned so as to be located on the apex of the anvil to fully expose the area to be smoothed. The surface of the roller should be tangent to the anvil's apex. Using a round anvil allows heat and pressure to be concentrated along the edge of the overlap. In further embodiments, the heated pressure roller is used in an automated system where the heated roller is affixed to a linear actuator which drives it tangent to the roller's apex along its length. Temperature may be controlled by means of a thermostat controller while pressure may be controlled by spring tension.

By applying the heated upper anvil to the edge of the seam region, where the welded seam is sandwiched between the upper and lower anvils, the welded seam is thus compressed under high pressure. Both the upper and lower anvils may be heated so that during the compression, the seam material is also heated close to its glass transition temperature to further facilitate the reformation of the welded seam and to produce a smooth welded seam. The upper and lower anvils may be heated by heating components embedded in the upper and lower anvils, and which are controlled by a thermostatic controller. In this embodiment, the welded seam may be reduced in seam thickness by from about 25 to about 35 percent.

The following Examples are provided.

Comparative Example 1

A seamed intermediate transfer belt (ITB) was prepared as follows. A 76.3 micron thick intermediate transfer sheet comprised of a mixture of 91 weight percent of KAPTON® KJ (available from E.I. DuPont) and 9 weight percent of polyaniline (1.7 microns in diameter size) was cut to a size of 362 millimeters wide by 2,210.8 millimeters long. The ends were overlapped by 250 microns, and an ultrasonic horn was used to compress the above mixture against a steel welding platen, melting the mixture in the overlap region, and creating a seam. The seam was then reverse welded, resulting in an intermediate transfer belt comprising a reverse double welded seam of about 100 microns thick.

The surface resistivity of the above formed ITB was measured using a High Resistivity Meter (Hiresta-Up MCP-HT450 obtained from Mitsubishi Chemical Corp., under 1,000 V, averaging four measurements at varying spots, 72° F./65 percent room humidity), and was about $1\times10^{10}$ ohm/sq.

Example I

The Comparative Example 1 seamed ITB was overcoated (overcoat layer) by a known draw bar coating method. The overcoat layer coating solution was prepared by introducing into an amber glass bottle in a weight ratio of 39.2/58.8/2 CYMEL® 1171, a highly methylated-ethylated glycoluril resin, represented by

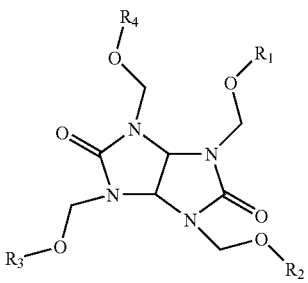

with at least 75 percent of the R groups being methyl/ethyl, and the remainder of the R groups being hydrogen, and with a viscosity of from about 3,800 to about 7,500 centipoises at 23° C., commercially available from CYTEC Industries, Inc; DORESCO® TA22-8, a self crosslinking acrylic resin solution in ethanol/acetone (about 30 weight percent solid) obtained from Lubrizol Dock Resins, and with a resin glass transition temperature of 79° C.; and p-toluenesulfonic acid (pTSA), an acid catalyst. The resulting mixture was then dissolved in DOWANOL™ to form a solution containing about 15 percent by weight solids.

The resulting overcoat layer was crosslinked upon thermal curing at 160° C. for 5 minutes, resulting in a 6 micron thick mechanically robust polymeric layer on the seam comprised of CYMEL® 1170/DORESCO® TA22-8/pTSA at a ratio of 39.2/58.8/2 with a surface resistivity of about $5.4\times10^8$ ohm/sq.

Example II

The above process of Example I was repeated except that the overcoat layer on the seam was comprised of CYMEL® 1170/DORESCO® TA22-8/pTSA at a ratio of 34.3/63.7/2 with a surface resistivity of about $3.2\times10^9$ ohm/sq.

Example III

The above process of Example I was repeated except that the overcoat layer on the seam was comprised of CYMEL® 1170/DORESCO® TA22-8/pTSA at a ratio of 29.4/68.6/2 with a surface resistivity of about $1.2\times10^{10}$ ohm/sq, which matched that of the ITB itself (about $1\times10^{10}$ ohm/sq).

Example IV

The above process of Example I was repeated except that the overcoat layer on the seam was comprised of CYMEL® 1170/DORESCO® TA22-8/pTSA at a ratio of 24.5/73.5/2 with a surface resistivity of about $3.3\times10^{11}$ ohm/sq.

Print Tests

The above overcoated seamed ITB devices of Examples I, II, III and IV, and the noncoated seamed ITB device of Comparative Example 1 were print tested on a Xerox Corporation DC5000 printer. After 100 prints, a full page image quality analysis of 50 percent of the halftone images were visually evaluated (Table 1), especially around the overcoated seam areas.

TABLE 1

| | Seam Printout |
|---|---|
| Comparative Example 1, Nonovercoated ITB with a Surface Resistivity of About $1 \times 10^{10}$ Ohm/Sq | Visible |
| Example I, Overcoated ITB with an Overcoat Surface Resistivity of About $5.4 \times 10^8$ Ohm/Sq | Visible |
| Example II, Overcoated ITB with an Overcoat Surface Resistivity of About $3.2 \times 10^9$ Ohm/Sq | Slightly Visible |
| Example III, Overcoated ITB with an Overcoat Surface Resistivity of About $1.2 \times 10^{10}$ Ohm/Sq | Invisible |
| Example IV, Overcoated ITB with an Overcoat Surface Resistivity of About $3.3 \times 10^{11}$ Ohm/Sq | Slightly Visible |

The surface resistivity of the overcoat crosslinked resin mixture layer can be adjusted by varying the weight ratio of the glycoluril resin and the self crosslinking acrylic resin. For example, the overcoat layer resistivity changed from about $10^8$ to about $10^{11}$ ohm/sq when the weight ratio of the glycoluril resin and the self crosslinking acrylic resin changed from about 40/60 to about 25/75.

When the overcoat layer resistivity matched that of the ITB itself as in Example III, the seam printout was invisible, resulting in an imageable seamed ITB. When the overcoat layer resistivity did not match that of the ITB itself as in Examples I, II and IV, the seam printout was invisible or slightly visible.

The above data demonstrates that the Example III overcoated imageable seamed ITB had the advantages indicated. The seam was formed, as illustrated herein, by a first ultrasonic welding, and then turned upside down and welded a second time. Both the overcoated area and the seam were invisible for 100 xerographic prints, while for the Comparative Example 1 ITB with the noncoated seam, the seam was visible for each of the 100 xerographic prints. The glycoluril resin/acrylic resin of the Example III overcoated ITB was mechanically robust with the seamed region remaining invisible for 400,000 prints in contrast to the Comparative Example 1 ITB where the seamed region was visible beginning with the first print, and remained visible for 400,000 prints.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A xerographic intermediate transfer member configured for accepting a developed latent image from a photoconductor and thereafter transferring the developed image to a document the member consisting essentially of at least one seamed substrate, and wherein said seam is coated with a crosslinked mixture of a glycoluril resin and an acrylic resin.

2. A xerographic intermediate transfer member in accordance with claim 1 wherein said substrate consists essentially of carbon black and a polymer selected from the group consisting of a polyimide, a polycarbonate, a polyamideimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof, and said at least one seam is one seam or two seams.

3. A xerographic intermediate transfer member in accordance with claim 1 wherein said substrate is consists essentially of a polyaniline and a polymer selected from the group consisting of a polyimide, a polycarbonate, a polyamideimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof, and said at least one seam is one seam or two seams, and said crosslinked is from about 50 to about 95 percent.

4. A xerographic intermediate transfer member in accordance with claim 1 wherein said substrate is consists essentially of a metal oxide and a polymer selected from the group consisting of a polyimide, a polycarbonate, a polyamideimide, a polyphenylene sulfide, a polyamide, a polysulfone, a polyetherimide, a polyester or polyester copolymer, a polyvinylidene fluoride, a polyethylene-co-polytetrafluoroethylene, and mixtures thereof.

5. A xerographic intermediate transfer member in accordance with claim 1 wherein said mixture of said glycoluril resin and said acrylic resin consists of from about 1 to about 99 weight percent of said glycoluril, and from 99 to about 1 weight percent of said acrylic resin, and wherein the total thereof is about 100 percent, and said crosslinked is from about 50 to about 100 percent.

6. A xerographic intermediate transfer member in accordance with claim 1 wherein said mixture of said glycoluril resin and said acrylic resin consists of from about 55 to about 85 weight percent of said glycoluril, and from 45 to about 15 weight percent of said acrylic resin, and wherein the total solids thereof is about 100 percent.

7. A xerographic intermediate transfer member in accordance with claim 1 wherein said glycoluril resin is represented by

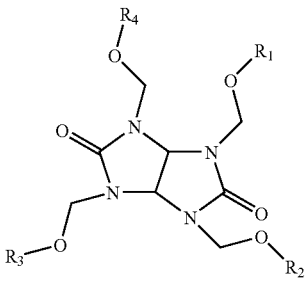

wherein each R group is at least one of hydrogen and alkyl.

8. A xerographic intermediate transfer member in accordance with claim 7 wherein said glycoluril resin possesses a number average molecular weight of from about 200 to about 1,000, and a weight average molecular weight of from about 230 to about 3,000, and each R group is alkyl with from about 1 to about 4 carbon atoms.

9. A xerographic intermediate transfer member in accordance with claim 7 wherein said glycoluril resin possesses a number average molecular weight of from about 250 to about 600, and a weight average molecular weight of from about 280 to about 1,800, and each R is n-butyl, isobutyl, methyl, or ethyl.

10. A xerographic intermediate transfer member in accordance with claim 7 wherein each of said R groups is hydrogen.

11. A xerographic intermediate transfer member in accordance with claim 7 wherein each of said R groups is alkyl with from 1 to about 10 carbon atoms.

12. A xerographic intermediate transfer member in accordance with claim 1 wherein said crosslinked acrylic resin possesses a bulk resistivity of from about $10^8$ to about $10^{14}$ ohm/sq.

13. A xerographic intermediate transfer member in accordance with claim 1 wherein said acrylic resin possesses a bulk resistivity, at about 20° C. and at about 50 percent relative humidity, of from about $10^9$ to about $10^{12}$ ohm/sq.

14. A xerographic intermediate transfer member in accordance with claim 1 wherein said acrylic resin possesses a weight average molecular weight ($M_w$) of from about 100,000 to about 500,000, and a polydispersity index (PDI) ($M_w/M_n$) of from about 1.5 to about 4.

15. A xerographic intermediate transfer member in accordance with claim 1 wherein said acrylic resin possesses a weight average molecular weight ($M_w$) of from about 120,000 to about 200,000, and a polydispersity index (PDI) ($M_w/M_n$) of from about 2 to about 3.

16. A xerographic intermediate transfer member in accordance with claim 1 wherein said acrylic resin is crosslinked by heating.

17. A xerographic intermediate transfer member in accordance with claim 1 wherein said mixture of said glycoluril resin and said acrylic resin further includes an acid catalyst selected in an amount of from about 0.1 to about 2 weight percent, a siloxane component, or a fluoro component, each selected in an amount of from about 0.1 to about 5 weight percent.

18. A xerographic intermediate transfer member in accordance with claim 17 wherein said acid catalyst is a toluenesulfonic acid; said siloxane component is a hydroxyl derivative of a silicone modified polyacrylate, a polyether modified acryl polydimethylsiloxane, a polyether modified hydroxyl polydimethylsiloxane, or an alkoxysilane comprised of at least one alkoxy group bonding to at least one silicon atom, and said alkoxy is methoxy, ethoxy, n-propoxy, isopropoxy, n-butoxy, or isobutoxy; and said fluoro component is at least one of hydroxyl derivatives of perfluoropolyoxyalkanes; hydroxyl derivatives of perfluoroalkanes; carboxylic acid derivatives of fluoropolyethers; carboxylic ester derivatives of fluoropolyethers; carboxylic ester derivatives of perfluoroalkanes; sulfonic acid derivatives of perfluoroalkanes; silane derivatives of fluoropolyethers; and phosphate derivatives of fluoropolyethers, and said at least one seam is one seam or two seams.

19. A xerographic intermediate transfer member in accordance with claim 1 further including an outer release layer positioned on said substrate coating.

20. A xerographic intermediate transfer member in accordance with claim 19 wherein said release layer consists of a fluorinated ethylene propylene copolymer, a polytetrafluoroethylene, a polyfluoroalkoxy polytetrafluoroethylene, a fluorosilicone, a copolymer or terpolymer of vinylidenefluoride, hexafluoropropylene, tetrafluoroethylene, or mixtures thereof.

21. An intermediate transfer belt consisting of a supporting substrate with from about 1 to about 4 seams, and wherein said seam(s) is/are coated of a mixture of a glycoluril resin and a self crosslinking acrylic resin.

22. An intermediate transfer belt in accordance with claim 21 wherein prior to said coating the seams have a roughened surface, and subsequent to said coating the seamed areas are smooth, and wherein said seams are 1 or 2.

23. An intermediate transfer belt in accordance with claim 21 wherein there is further included in said coating a catalyst.

24. A xerographic intermediate transfer belt in accordance with claim 7 wherein said glycoluril resin is a butylated glycoluril formaldehyde resin present in an amount of from about 50 to about 90 weight percent, and said acrylic resin is present in an amount of from about 50 to about 10 weight percent, and wherein the total solids thereof is about 100 percent.

* * * * *